United States Patent
Clancy

(10) Patent No.: US 8,703,288 B2
(45) Date of Patent: Apr. 22, 2014

(54) LOW SMOKE, FIRE AND WATER RESISTANT CABLE COATING

(75) Inventor: Tim Clancy, Indianapolis, IN (US)

(73) Assignee: General Cable Technologies Corporation, Highland Heights, KY (US)

( * ) Notice: Subject to any disclaimer, the term of this patent is extended or adjusted under 35 U.S.C. 154(b) by 1166 days.

(21) Appl. No.: 12/052,888

(22) Filed: Mar. 21, 2008

(65) Prior Publication Data

US 2009/0238957 A1 Sep. 24, 2009

(51) Int. Cl.
*D02G 3/00* (2006.01)
*H01B 3/10* (2006.01)

(52) U.S. Cl.
USPC ........... 428/379; 428/375; 428/372; 428/389; 174/118; 174/121 A; 174/110 A; 174/110 PM; 524/405; 524/406; 524/451; 427/117; 427/120

(58) Field of Classification Search
None
See application file for complete search history.

(56) References Cited

U.S. PATENT DOCUMENTS

| | | | | |
|---|---|---|---|---|
| 3,383,188 A | * | 5/1968 | Michelson et al. | 428/632 |
| 4,001,128 A | | 1/1977 | Penneck et al. | |
| 4,022,945 A | | 5/1977 | MacKenzie, Jr. et al. | |
| 4,671,896 A | * | 6/1987 | Hasegawa et al. | 523/210 |
| 4,722,959 A | * | 2/1988 | Inoue et al. | 524/412 |
| 4,743,644 A | * | 5/1988 | Skipper et al. | 524/437 |
| 4,869,848 A | * | 9/1989 | Hasegawa et al. | 252/609 |
| 5,057,367 A | * | 10/1991 | Morii et al. | 428/389 |
| 5,059,651 A | * | 10/1991 | Ueno | 524/424 |
| 5,561,185 A | | 10/1996 | Hashimoto et al. | |
| 5,650,205 A | * | 7/1997 | Shukushima | 428/35.8 |
| 5,707,732 A | * | 1/1998 | Sonoda et al. | 428/357 |
| 5,726,231 A | * | 3/1998 | Namiki et al. | 524/413 |
| 5,912,436 A | | 6/1999 | Sanchez et al. | |
| 5,955,525 A | | 9/1999 | Sanchez et al. | |
| 6,025,422 A | | 2/2000 | Hall | |
| 6,143,816 A | * | 11/2000 | Prescher et al. | 524/444 |
| 6,372,344 B1 | * | 4/2002 | Castellani et al. | 428/379 |
| 6,403,228 B1 | * | 6/2002 | Mack et al. | 428/447 |
| 6,495,760 B1 | * | 12/2002 | Castellani et al. | 174/110 R |
| 6,576,160 B1 | * | 6/2003 | Eichler et al. | 252/609 |
| 6,740,396 B2 | * | 5/2004 | Carrus et al. | 428/331 |
| 6,803,517 B2 | | 10/2004 | Caimi et al. | |
| 6,808,809 B2 | * | 10/2004 | Herbiet et al. | 428/407 |
| 6,828,022 B2 | * | 12/2004 | Bisleri et al. | 428/375 |

(Continued)

FOREIGN PATENT DOCUMENTS

| CA | 2402653 A1 | 3/2004 |
|---|---|---|
| WO | WO-9510565 | 4/1995 |

(Continued)

OTHER PUBLICATIONS

Chemical Database—Aluminum hydroxide; Barbalace, K.; EnvironmentalChemistry.com;1995-2011.*

(Continued)

*Primary Examiner* — Jill Gray
(74) *Attorney, Agent, or Firm* — Blank Rome LLP

(57) ABSTRACT

Cable coatings having effective low-smoke emission, fire resistance and moisture resistance provided by a single layer are described. The cable coatings contain an base polymer, a oxygen containing ethylene copolymer, a fire retardant and a synergistic blend of magnesium hydroxide and aluminum hydroxide. Cables coated with the described coatings have improved wet electrical performance, and satisfactory fire performance and smoke characteristics.

12 Claims, 1 Drawing Sheet

(56) References Cited

U.S. PATENT DOCUMENTS

| | | | |
|---|---|---|---|
| 6,924,031 B2 * | 8/2005 | Grizante Redondo et al. | 428/372 |
| 6,995,198 B2 * | 2/2006 | Toshimitsu et al. | 523/204 |
| 7,056,585 B2 * | 6/2006 | Mishima et al. | 428/413 |
| 7,244,892 B2 * | 7/2007 | Toshimitsu et al. | 174/68.1 |
| 7,504,451 B1 * | 3/2009 | Brown et al. | 524/445 |
| 7,586,043 B2 * | 9/2009 | Sato | 174/110 R |
| 2004/0217376 A1 | 11/2004 | Ahsan et al. | |
| 2006/0036006 A1 | 2/2006 | Heschke et al. | |
| 2006/0038161 A1 | 2/2006 | Alfonso et al. | |
| 2006/0226404 A1 | 10/2006 | Bauer et al. | |
| 2007/0149677 A1 * | 6/2007 | Huang et al. | 524/425 |
| 2007/0217993 A1 * | 9/2007 | Reimer et al. | 423/625 |
| 2009/0124743 A1 | 5/2009 | Lee | |
| 2009/0238957 A1 * | 9/2009 | Clancy | 427/117 |

FOREIGN PATENT DOCUMENTS

| | | | |
|---|---|---|---|
| WO | WO-9840895 | | 9/1998 |
| WO | WO-9905688 | | 2/1999 |
| WO | WO 9905688 | * | 2/1999 |
| WO | WO-0066657 A1 | | 11/2000 |
| WO | WO 2006118254 A1 | * | 11/2006 |
| WO | WO-2007040019 A1 | | 4/2007 |
| WO | WO2009103430 A2 | * | 8/2009 |

OTHER PUBLICATIONS

Piedra, et al., "Solid-State 1H NMR Studies of Aluminum Oxide Hydroxides and Hydroxides," Inorganic Chemistry, 1996, pp. 3474-3478, vol. 35, American Chemical Society, Washington, DC, USA.

* cited by examiner

LOW SMOKE, FIRE AND WATER RESISTANT CABLE COATING

FIELD OF THE INVENTION

The present invention provides a new and improved cable coating. The coating or insulation is effective for low-smoke emission, fire-resistance and moisture resistance and may be used in a single layer.

BACKGROUND OF THE INVENTION

Wire and cable insulation or coating compositions are normally quite flammable. As a result, they can pose a fire hazard in power plants, distribution areas, manholes, and buildings. Ignition can easily occur from overheating or arcing. Therefore, flame retardants are generally used in wire and cable coatings to prevent electric sparks and subsequently to prevent the spread of fire along the cable.

Flame retardants such as halogenated additives (compounds based on fluorine, chlorine or bromine) or halogenated polymers, such as chlorosulfonated polyethylene, neoprene, polyvinyl chloride, or the like, are commonly used as flame retardants in wire and cable insulation or coating compositions. Both halogenated additives and halogenated polymers are capable of giving fire-resistant properties to the polymer that forms the coating. Halogens, however, have a major drawback in that the gases evolved (i.e. hydrogen chloride, hydrogen fluoride and hydrogen bromide) during burning, or even merely overheating, are corrosive as well as being toxic. As a result, the use of halogenated additives or halogenated compounds are not recommended in enclosed locations.

A second alternative for providing flame retardancy for wire and cable insulation, especially those made of polyolefins, is to use an inorganic oxide, such as aluminum, magnesium, titanium, and bismuth oxides, in hydrated form, as a filler in the polymer matrix. The hydrated metal oxide provides flame retardancy by a mechanism known as water of hydration. When the hydrated metal is heated, water is evolved which effects a flame retardant action. A drawback of this system is that the hydrated metal oxide is polar which absorbs moisture when the cable is exposed to a wet environment, resulting in a reduction in the electrical insulation properties of the coating composition.

U.S. Pat. No. 6,803,517 to Caimi discloses the addition of a silane-based coupling compound to the coating mixture to improve the compatibility of the hydrated metal oxide and the olefinic base polymer.

WO 95/10565 discloses a flame retardant cable and wire insulation comprising polyolefin, melamine as a flame retardant, polyphenylene oxide and silicaceous filling.

U.S. Pat. No. 6,025,422 to Hall discloses a flame retardant polymer composition comprising a polymer blend of aliphatic polyketone and hydrated inorganic filler.

U.S. Pat. No. 6,143,816 to Prescher et al. discloses a fire retardant plastic material comprising a plastic mixture which contains 55 to 75 percent by weight of boehmite.

WO 99/05688 discloses a low-smoke and flame-retardant cable coating comprising a polymer mixture and magnesium hydroxide as the flame retardant.

U.S. Pat. No. 5,955,525 to Sanchez et al. discloses a fire resistant, low-smoke wire insulation comprising a hydrated inorganic charge, an alkoxysilane, an additive, a hindered phenol, and a zinc-mercapto toluimidazol salt.

U.S. Pat. No. 4,001,128 to Penneck discloses a filler system for polymers which provides a high voltage insulation material which is resistant to tracking. Penneck discloses a combination of alumina trihydrate together with a chemically treated silica filler in combination with various polymeric materials as having improved tracking resistance in high voltage insulating applications. Ethylene-vinyl acetate copolymers are disclosed among those which may be modified utilizing the disclosed fillers. Such insulating materials may also be crosslinked.

U.S. Pat. No. 4,022,945 to MacKenzie, Jr., et al discloses a fire retardant system for polymeric compositions comprising a combination of a halogen-containing hydrocarbon and an oxide of iron. The disclosed compositions may include ethylene-vinyl acetate copolymers in admixture with various modifiers in addition to the specific flame-retardant agents disclosed as components of the insulation material.

None of the documents discussed above address the problem of moisture resistance in a fire resistant cable insulation. As has been previously discussed, exposure of a fire resistant cable to a wet environment significantly reduces the dielectric insulation properties of the cable coating, which can be a significant problem for underground cables, cables used on ships, and under water cables.

WO 98/40895 discloses a fire-resistant, moisture resistant cable coating comprising two layers of coating. An inner layer constructed to impart moisture resistance to the coating; and an outer layer constructed to impart fire-resistance to the cable.

U.S. Pat. No. 5,912,436 to Sanchez et al. discloses a cable coating comprising three layers. A layer designed to impart moisture resistance; a layer designed to impart low-smoke emission; and a layer designed to impart flame-retardant properties.

Although both WO 98/40895 and U.S. Pat. No. 5,912,436 address low smoke emission, fire-resistance and moisture resistance in a coating, the coating comprises multiple layers which significantly increases the construction cost and complexity of the cable.

Applicant has developed a new cable coating capable of low smoke emission, fire-resistance and moisture resistance in a single layer. The new cable coating has improved wet electrical performance and satisfactorily meets small gauge (#14 AWG) fire performance VW-1 rating, and limited smoke characteristic as defined in UL 1685 for cable tray usage.

SUMMARY OF THE INVENTION

The present invention provides a new and improved cable coating, which is effective for low-smoke emission, fire-resistance and moisture resistance in a single layer. The new cable coating exhibits improved wet electrical performance, small gauge (#14 AWG) fire performance VW-1 rating, and limited smoke characteristic as defined in UL 1685 for cable tray usage.

The present invention provides a low smoke, fire-resistant and moisture resistant cable coating, said coating comprising
(a) a base polymer;
(b) at least 5% by weight of total polymer of an oxygen-containing ethylene copolymer;
(c) a fire retardant; and
(d) at least 60 percent by weight of a synergistic blend of magnesium hydroxide and aluminum monohydrate.

In a preferred embodiment the present invention provides a low smoke, fire-resistant and moisture resistant cable coating, said coating comprising
(a) a base polymer;
(b) at least 5% by weight of total polymer of an oxygen-containing ethylene copolymer;

(c) a fire retardant; and
(d) at least 60 percent by weight of a synergistic blend of magnesium hydroxide and aluminum monohydrate, wherein the magnesium hydroxide and the aluminum monohydrate have been treated with oligomeric silane.

The invention also provides a low smoke, fire-resistant and moisture resistant cable comprising a conductor and a coating, said coating comprising:
(a) a base polymer;
(b) at least 5% by weight of total polymer of an oxygen-containing ethylene copolymer;
(c) a fire retardant; and
(d) at least 60 percent by weight of a synergistic blend of magnesium hydroxide and aluminum monohydrate.

In a preferred embodiment the invention provides a low smoke, fire-resistant and moisture resistant cable comprising a conductor and a coating, said coating comprising:
(a) a base polymer;
(b) at least 5% by weight of total polymer of an oxygen-containing ethylene copolymer;
(c) a fire retardant; and
(d) at least 60 percent by weight of a synergistic blend of magnesium hydroxide and aluminum monohydrate, wherein the magnesium hydroxide and the aluminum monohydrate have been treated with oligomeric silane.

The invention also provides a method of making a low smoke, fire-resistant and moisture resistant cable comprising
(a) coating an electrical conductor with a coating, said coating comprising a base polymer; at least 5% by weight of total polymer of an oxygen-containing ethylene copolymer; a fire retardant; and at least 60 percent by weight of a synergistic blend of magnesium hydroxide and aluminum monohydrate.

In a preferred embodiment the invention provides a method of making a low smoke, fire-resistant and moisture resistant cable comprising
(a) coating an electrical conductor with a coating, said coating comprising a base polymer; at least 5% by weight of total polymer of an oxygen-containing ethylene copolymer; a tin based char former; and at least 60 percent by weight of a synergistic blend of magnesium hydroxide and aluminum monohydrate, wherein the magnesium hydroxide and the aluminum monohydrate are treated with oligomeric silane.

DETAILED DESCRIPTION OF THE INVENTION

I. Coating Material

Figure 1:
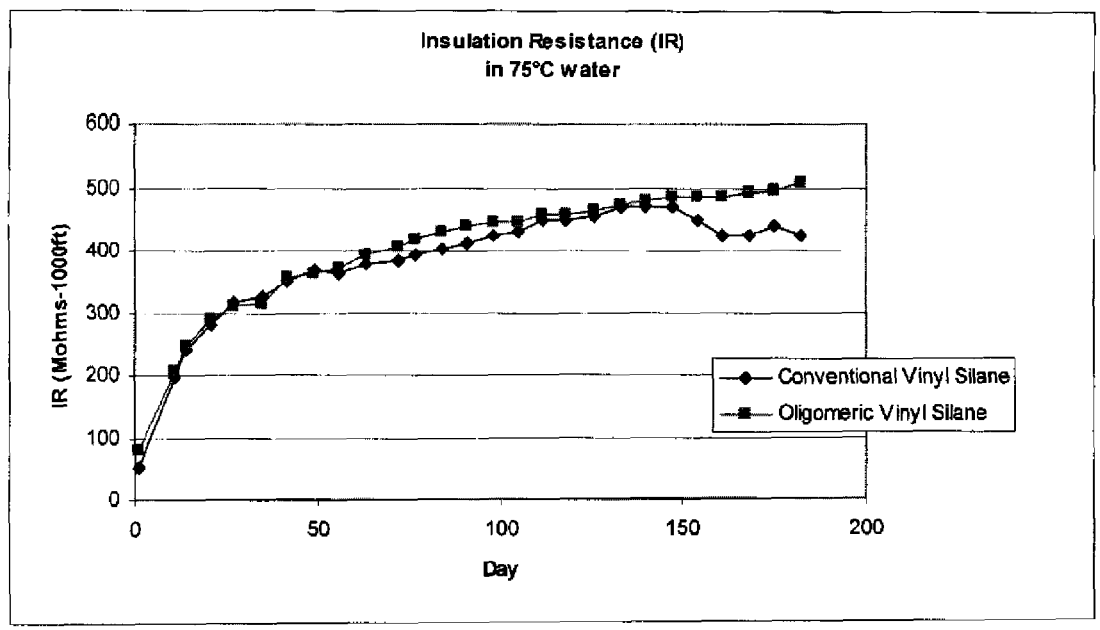
FIG. 1 is a graph showing the insulation resistance (IR) of oligomeric vinyl silane and conventional vinyl silane over time at 75° C.

A successful cable coating is often a combination of several components working together. The base polymer is a polymer generally chosen for its flexibility and/or chemical resistance. Added to the base polymer are fillers, fire-retardant aid(s), stabilizers, additional antioxidants, hindered amine light stabilizers which may improve the thermal and electrical properties, processing aids, pigments, dyes, colorants, metal deactivators, oil extenders, stabilizers, lead stabilizer additives such as dibasic lead phthalate, red lead, lubricants and curing agents to reinforce, to improve resistance to breakdown, to impart flame resistance and to vulcanize the coating. The compositions of the current invention are prepared by combining the required components in the correct proportions in conventional blending equipment such as a rubber mill or mixer, for example a Banbury mixer. This is usually done above the melting temperature of the polymeric material.

A. Base Polymer

Polymers used in cable coating fall into two broad classifications: polyolefins and synthetic rubbers. Polyolefins include the large family of polyethylenes, copolymers of ethylene and alpha olefins, and copolymers of ethylene and vinyl acetates or vinyl acrylates. Synthetic rubbers include Polychloroprene, Polyisoprene, Polybutadiene, Butyl Rubber, SBR, and EPDM.

In a preferred embodiment of the present invention, polyolefins are used as the polymer. A suitable polyolefin is polyethylene which comes in various molecular weights, densities, and molecular forms. A useful polyethylene is low-density polyethylene (LDPE), sometimes called Type I polyethylene, which has a density of about 0.910 to 0.925 g/cm$^3$. LDPE can be used as insulation for outdoor or underground applications, where it is usually crosslinked or cured with organic peroxides.

Another useful polyethylene is linear low-density polyethylene (LLDPE). LLDPE is made by a special manufacturing process that minimized side chain branching. LLDPE is often blended with LDPE to impart increased tensile strength and abrasion resistance.

Another useful polyethylene is medium-density polyethylene (MDPE). MDPE has a density of 0.926 to 0.940 g/cm$^3$. MDPE can be blended with LDPE to impart stiffness and abrasion resistance.

Polypropylene may also be used to practice present invention. Modified polypropylene and functionalized polypropylene are prepared in U.S. Pat. Nos. 3,480,580 and 3,481,910, which are hereby incorporated by reference.

A thermoplastic elastomer (TPE) may also be used to practice the present invention. TPE's are usually blends of ethylene and propylene with other proprietary polymers added to give specific properties. TPE's can be melted and reprocessed repeatedly and have excellent elongation values.

The most preferred polyolefin in accordance with the invention is selected from the group consisting of alpha-olefin copolymers such as ethylene-octene copolymer, ethylene-butene copolymer, ethylene-hexene copolymer and mixtures thereof.

The polyolefins and elastomers discussed above represent the main categories of polymers which may be used to practice the present invention. The main desired properties of the olefinic base copolymer are that it accept filler and be flexible. However, it is understood that one of ordinary skill in the art may be able to select other polyolefins in practicing the present invention.

B. Oxygen-Containing Ethylene Copolymer

The desired properties and function of the oxygen-containing ethylene copolymer additive in accordance with the invention, which does not necessarily have to be an elastomer, is that it attaches, bonds, or otherwise has an affinity or reacts with the components of the flame, smoke and water resistant additive package and helps create a dispersed polymeric matrix.

In a preferred embodiment of the present invention, polyolefins created from copolymers of ethylene and vinyl acetate or ethylene and vinyl acrylate are used as the oxygen-containing ethylene copolymer. A suitable polyolefin is ethylene vinyl acetate (EVA) which comes in various molecular weights, densities, and co-monomer contents. EVA can be used in a blend or by itself to impart the interaction needed between the flame retardant fillers and other functional additives.

Another useful polyolefin is ethylene acrylic acid which comes in various molecular weights and acrylic acid contents. It is often blended with other polyolefins and is useful when a strong polymer-filler interaction is desired.

Other useful polyolefins are polyethylenes, alpha-olefin copolymers, or oxygen-containing ethylene copolymers which have been grafted or copolymerized with maleic anhydride. The grafting commonly accomplished through the use of organic peroxide initiators during a batch or continuous extrusion process.

The most preferred oxygen-containing ethylene copolymer additive in accordance with the invention is selected from the group consisting of ethylene methyl acrylate, ethylene ethyl acrylate, ethylene butyl acrylate copolymers, and mixtures thereof. These polyolefins are useful when higher thermal stability and lower temperature flexibility are desired.

C. Fillers

Fillers are generally added to the coating for reinforcement and cost reduction. By definition, a filler is added in large amounts. In the present invention, the filler is preferably greater than 60 percent by weight. Fillers are generally segregated in many categories: carbon black, oils, microsphere, glass fibers, synthetic hydrated minerals, aluminosilicates, hydrated structured silicates, and synthetic anionic hydrotalcite.

In a preferred embodiment of the present invention, mineral fillers are most useful. The filler preferably not only adds reinforcement, but also imparts fire-resistance and moisture-resistance to the coating. A preferred filler of the present invention is a synergistic mixture of magnesium hydroxide $(Mg(OH)_2)$ and aluminum monohydrate $(AlO(OH))$. A common commercial source of aluminum monohydrate is boehmite, which is particularly suitable as a fire-retardant filler material because of its small grain size and high degree of fineness.

In preferred embodiments of the invention, in order to improve the wet dielectric insulation performance of the coating, the mineral fillers are rendered hydrophobic via treatment with a silane compound. Various silanes may be used in accordance with the invention, such as an alkoxysilane, in particular vinyl trimethoxyethoxysilane, vinyl tri(2-methoxy-ethoxy)silane, phenyl tris(2-methoxyethoxy)silane, methyltriethoxysilane, ethylmethyl tris(2-methoxyethoxy) silane, dimethyl diethoxysilane, ethyl trimethoxysilane, vinyl triethoxysilane, and vinyl trimethoxysilane.

In the most preferred embodiment, the mineral fillers are rendered hydrophobic via treatment with an oligomeric silane surface treatment, for example an oligomer of vinyl triethoxy silane and propyltriethoxy silane or an oligomer of vinyl tri-methoxy silane and propyltrimethoxy silane. These oligomers have an effective vinyl content of between 8 wt % and 20 wt %, preferably between 10 wt % and 12 wt %.

In a preferred embodiment of the present invention, the preferred flame retardant fillers, prior to combining or compounding with all other ingredients of the final coating, are independently surface treated using a batch or continuous coating process to react the preferred alkoxysilane to the surface of the mineral filler via a hydrolysis reaction to further improve the wet electrical performance of the coating. Common practice is to inject the neat liquid onto the dry filler and allow frictional or externally applied heat to accelerate the hydrolysis and subsequent release of alcohol by-products such as ethanol or methanol.

To further improve wet dielectric performance of the coating, the overall filler content includes a quantity of an alkoxysilane surface treated calcined aluminosilicate with a Kaolinite structure due to its low dielectric constant relative to the hydrated minerals. This mineral does not impart any flame retarding properties to the coating other than having a dilution effect.

As an example of the efficacy of the preferred treatment onto magnesium hydroxide in the absence of other fire retardant aids, improvements to long term wet electrical aging properties are illustrated in the Examples below.

D. Fire-Retardant Aids

In addition to the filler, a fire-retardant is also added to the coating. General flame-retardant aids include antimony trioxide, antimony pentoxide, antimony tetraoxide, hexaantimony tridecaoxide, crystalline antimonic acid, lithium antimonate, barium antimonate, zinc borate, zinc stannate, basic zinc molybdate, zinc calcium molybdate, zirconium oxide, zinc oxide, iron oxide, red phosphorus, hydrated structured silicates, synthetic anionic hydrotalcite, and carbon black. Of these, a tin based char former, zinc stannate, is the preferred flame-retardant.

The amount of the flame-retardant aid per 100 parts by weight of the polymer is preferably 3 to 20 parts by weight, more preferably 5 to 18 parts by weight. When the above amount is smaller than 3 parts by weight, the effect on flame retardancy is insufficient. When it exceeds 20 parts by weight, the flame retardancy is not improved any further, and such a large amount is disadvantageous for economic performance.

E. Stabilizers

Stabilizers are used primarily for long term stability and moisture resistance under dielectric stress, specifically dielectric constant or specific inductive capacitance (SIC). These additives act to immobilize active ions to form salts that are insoluble in water at higher temperatures such as 75° C. or 90° C. These ions are typically present in the ppm level and exist as impurities within various additives used within this embodiment. Examples of stabilizers include lead stabilizer additives such as dibasic lead phthalate and red lead. A non-lead example is hydrotalcite. Dibasic lead phthalate is the preferred stabilizer.

E. Antioxidants

Antioxidants are added to the coating to prevent oxidative degradation of polymers. Commonly used antioxidants are hydroquinones, hindered-phenols, phosphites, thioesters, epoxies, and aromatic amines. The preferred antidoxidants used in wire and cable are hydroquinones and/or hindered-phenols. A common hydroquinone is 1,2-dihydro-2,2,4 trimethyl quinoline. Examples of hindered-phenols are distearyl 3,3'thio-dipropionate (DSTDP), bis(2,4 di terbutyl) pentaerythritol diphosphite, tris(2,4 di-terbutyl) pentaerythritol diphosphite, tris(2,4 di-terbutyl phenyl) phosphite, zinc 2-mercaptotoluimidazole salt, 2,2' thiodiethyl bis-(2,5-diterbutyl-4-hydroxyphenyl, 2,2'-thiobis-(6 terbutyl paracresol) and dilauryl 3,3' thio-dipropionate.

F. Curing Agents

The cable coating compositions can be vulcanized using traditional curing procedures, such as chemical, thermal, moisture, room temperature vulcanization (RTV) and radiation procedures. The curing agents employed in the present invention can be moisture cure. Generally, a moisture cure involves placing the compositions to be cured in a water bath or high humidity chamber. The composition may then be cured over time at room temperature or cured at a faster rate in a warm water bath or high humidity chamber, typically at 60-70° C., well below the melting point of the composition.

Further descriptions of moisture curing processes are provided in U.S. Pat. No. 7,037,459 to Easter, which is hereby incorporated by reference.

In a preferred embodiment, the cable coating compositions are vulcanized using organic peroxides, dicumyl peroxide and bis(terbutylperoxy) diisopropylbenzene, or blends thereof. The peroxides act by decomposing at the cure temperature to form free radicals which then abstract a hydrogen from adjacent polymer molecules allowing the polymers to bond covalently to each other. To select the curing agents it is necessary to take into account the decomposition temperatures of said agents, in order to avoid undesirable problems during the mixture and extrusion processes. The curing agent amounts and/or ratios to be used will be defined based on the type of application because depending on the increase of the curing agent content in the formula, the following properties will be improved and/or reduced.

F. Co-Agents

Co-agents are typically added to polymer compositions to assist with the crosslinking process. This class of additives is typically a monomer chemical or a low molecular weight polymer capable of grafting into the backbone of the base polymer system, polymerizing with itself, or both. Co-agent additives are commonly used in relatively low levels since they can have an effect on the rate of cure as well as the state of cure with elastomers and polyolefins. These loading levels can range from 0.5 phr to as high as 20 phr in some extreme cases.

The low molecular weight class of co-agents can also be functionalized with chemical moieties to impart further compatibilizing effects with the fillers, the base polymers, or between both. Functional groups can be maleic anhydride, hydroxyl groups, vinyl groups, amino groups, epoxy groups, siloxane groups, acrylic groups, styrenic groups, pyridine groups, and carboxylic acid groups. Of particular interest is the class of butadiene based copolymer with vinyl styrene.

Polybutadiene copolymers can vary by molecular weight, co-monomer content, and 1,2 vinyl content. The molecular weight is measured by viscosity in units of centipoise (cps) and can range between 5,000 and 100,000 cps and preferred between 10,000 and 50,000 cps. Comonomer contents are common between 10% and 50% by weight and preferred between 15% and 30%. The 1,2 vinyl content can vary between 10% and 80% and preferred between 15% and 50%.

In a preferred embodiment, the cable coating composition is blended with a polybutadiene styrene copolymer to further enhance the long term IR stability after immersion in 75° C. and 90° C. water. This improvement in stability is synergistic with the oligomeric vinyl silane based coating effect.

II. Processing

After mixing, the coating material is taken to an extruder. The material is fed through a hopper and carried down the length of a screw in the extruder, and forced through a crosshead die. At the same time, a conductor passes through the crosshead die where the molten coating material is applied around the conductor. This wire then goes through a continuous vulcanization steam tube. At the end of the tube, the wire is reeled off and packaged.

In the case of multiconductor cable, a second coated conductor is stranded or braided on to the reeled off wire. The cable is then passed through the crosshead die a second time where the outer coating is applied and vulcanized.

EXAMPLES

Example 1

Comparison of Cables Coated With Conventional Silane and Oligomeric Silane Containing Compositions Compositions containing either conventional silane or oligomeric silane were made according to the following formulations:

| Formulas (Relative to FIGS. 1 and 2 and Tables 1 and 2) | Conventional Silane | Oligomeric Silane |
|---|---|---|
| Ethylene-octene copolymer (0.87 density, 1 MI) | 92 | 92 |
| Ethylene vinyl acetate copolymer (9% VA) | 8 | 8 |
| Phenolic Antioxidant | 1.25 | 1.25 |
| Dibasic lead pthalate dispersion | 7.5 | 7.5 |
| Vinyl Silane treated clay | 20 | 20 |
| Vinyl silane treated Mg(OH)$_2$ | 180 | |
| Struktol WB 222 | 2 | 2 |
| Polybutadiene Styrene Copolymer | 3 | 3 |
| Vinyl Oligomeric silane treated Mg(OH)$_2$ | | 180 |
| Peroxide | 1.6 | 1.6 |
| Total PHR | 315.4 | 315.4 |

The compositions were prepared by a systematic weighment process of each raw material ingredient and charged into an internal Banbury mixer. Each composition was prepared separately through mastication and shear heating to a final batch temperature of approximately 300° F. then discharged and placed onto a 2-roll mill heated to 180° F. Strips of each compound were used to prepare a diced pellet for subsequent feeding into an extruder equipped with a steam vulcanization tube. Continuous curing was carried out at approximately 400° F. after a 0.045 inch thickness of coating was applied to a bare #14 AWG copper 7 wire conductor Cables coated with either a conventional silane based or oligomeric silane based coating were tested for their insulation resistance and electrical properties Both sets of wires were coiled and 10 feet of wire was immersed in a water bath heated to either 75° C. or 90° C. and maintained until the completion of the aging test at 26 weeks. Except for during measurements, a continuous 600VAC electrical stress was applied to all samples. SIC (Specific Inductive Capacitance), IR (Insulation Resistance), and Tan Delta was measured throughout the immersion and reported in Tables 1 and 2 below.

Tables 1 and 2 below represent a summary of the electrical measurements comparing the conventional silane surface based coating with the oligomeric silane based coating. When comparing measurements from the 75° C. condition, SIC (Specific Inductive Capacitance) and IR (Insulation Resistance) values are comparable between the two coatings after 26 weeks of immersion while Tan Delta is slightly worse with the Oligomeric Silane based coating (Table 1). However, data after 26 weeks of immersion in 90° C. water (Table 2) demonstrates the effect of the oligomeric silane based coating with a higher IR and lower Tan Delta despite showing a slight elevation in SIC as compared to the conventional silane.

Figure 2:
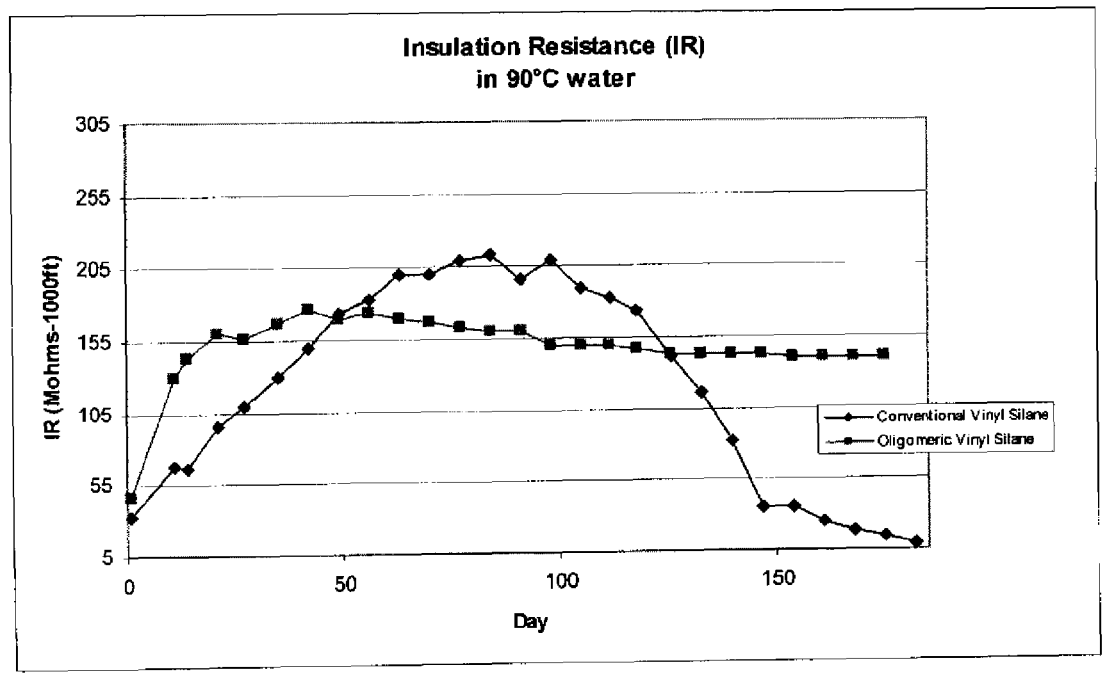
FIG. 2 is a graph showing the insulation resistance (IR) of oligomeric vinyl silane and conventional vinyl silane over time at 90° C.

Tables 1 and 2 report the maximum rate of decrease in IR at the point it occurs during the 26 week immersion while FIGS. 1 and 2 illustrate weekly IR measurements taken throughout the immersion period of 26 weeks at 75° C. and 90° C., respectively. Looking at Table 1 and FIG. 1, both coatings show good IR stability and comply with the maximum IR rate of increase after 12 weeks of immersion in accordance with UL 44 requirements. A decrease in IR stability is not seen until week 21 (98 days) with the conventional coating.

Table 2 illustrates the effect from the oligomeric silane based coating on IR after 26 weeks and on the maximum rate of decrease of IR for the entire immersion period. After immersion in 90° C. water, the IR stability from the oligomeric silane based coating is significantly improved over the conventional silane based coating.

TABLE 1

Electrical Testing in 75° C. water

| | Conventional Vinyl Silane | Oligomeric Vinyl Silane | Requirements |
|---|---|---|---|
| SIC* | 4.49 | 4.71 | |
| IR* | 423 | 507 | |
| Tan Delta* | 4.18 | 6.61 | |
| Max. Rate IR Decrease | 6% | 0% | 4% Max |
| Relative Permittivity (1 Day) | 4.49 | 4.71 | 6% Max |
| Increase in Capacitance (1-14 Days) | −2.09 | 1.23 | 3% Max |
| Increase in Capacitance (7-14 Days) | 0.04 | 0.55 | 1.5% Max |

(*Data at 26 weeks)

TABLE 2

Electrical Testing in 90° C. water

| | Conventional Vinyl Silane | Oligomeric Vinyl Silane | Requirements |
|---|---|---|---|
| SIC* | 4.58 | 4.91 | |
| IR* | 9 | 227 | |
| Tan Delta* | 9.55 | 7.95 | |
| Max. Rate IR Decrease | 56.8% | 2.7 | 4% Max |
| Relative Permittivity (1 Day) | 4.58 | 4.91 | 6% Max |
| Increase in Capacitance (1-14 Days) | −6.56 | −7.55 | 3% Max |
| Increase in Capacitance (7-14 Days) | −0.98 | −1 | 1.5% Max |

(*Data at 26 weeks)

Example 2

Cables Coated With Vinyl Oligomeric Silane Treated $Mg(OH)_2$ Compositions

Comparative composition samples 1-11 were made according to the following formulations, with compositions 7-11 containing vinyl oligomeric silane treated $Mg(OH)_2$:

Formulas (Relative to Table 3)

| | 1 | 2 | 3 | 4 | 5 | 6 |
|---|---|---|---|---|---|---|
| Ethylene-octene copolymer (0.87 density, 1 MI) | 100 | 100 | 100 | 100 | 100 | 100 |
| Phenolic Antioxidant | 1.5 | 1.5 | 1.5 | 1.5 | 1.5 | 1.5 |
| Dibasic lead pthalate dispersion | 7.5 | 7.5 | 7.5 | 7.5 | 7.5 | 7.5 |
| Vinyl Silane treated clay | 20 | 20 | 20 | 20 | 20 | 20 |
| Vinyl silane treated $Mg(OH)_2$ | 180 | 180 | 180 | 180 | 180 | 180 |
| Struktol WB 222 | 2 | 2 | 2 | 2 | 2 | 2 |
| Alkoxysilane-terminated Polybutadiene | | | 3 | | | |
| Polybutadiene Styrene Copolymer | | | | | 3 | |
| OH-terminated Polybutadiene | | | | 3 | | |
| MA-terminated Polybutadiene | | | | | | 3 |
| Vinyl Oligomeric silane dispersion | | | | | | 2 |
| Peroxide | 2.2 | 2.2 | 2.2 | 2.2 | 2.2 | 2.2 |
| Total PHR | 313.2 | 316.2 | 316.2 | 316.2 | 316.2 | 315.2 |

| | 7 | 8 | 9 | 10 | 11 |
|---|---|---|---|---|---|
| Ethylene-octene copolymer (0.87 density, 1 MI) | 100 | 100 | 100 | 100 | 100 |
| Phenolic Antioxidant | 1.5 | 1.5 | 1.5 | 1.5 | 1.5 |
| Dibasic lead pthalate dispersion | 7.5 | 7.5 | 7.5 | 7.5 | 7.5 |
| Vinyl Silane treated clay | 20 | 20 | 20 | 20 | 20 |
| Struktol WB 222 | 2 | 2 | 2 | 2 | 2 |
| Alkoxysilane-terminated Polybutadiene | | 3 | | | |
| Polybutadiene Styrene Copolymer | | | | | 3 |
| OH-terminated Polybutadiene | | | 3 | | |
| MA-terminated Polybutadiene | | | | 3 | |
| Vinyl Oligomeric silane treated $Mg(OH)_2$ | 180 | 180 | 180 | 180 | 180 |
| Peroxide | 2.2 | 2.2 | 2.2 | 2.2 | 2.2 |
| Total PHR | 313.2 | 316.2 | 316.2 | 316.2 | 316.2 |

The comparative compositions were prepared by a systematic weighment process of each raw material ingredient and charged into an internal Banbury mixer. Each composition was prepared separately through mastication and shear heating to a final batch temperature of approximately 300° F. then discharged and placed onto a 2-roll mill heated to 180° F. Strips of each compound were used to prepare a diced pellet for subsequent feeding into an extruder equipped with a steam vulcanization tube. Continuous curing was carried out at approximately 400° F. after a 0.045 inch thickness of coating was applied to a bare #14 AWG copper 7 wire conductor.

Cables coated with the comparative compositions were tested for insulation resistance rate change of regression between 19 and 24 weeks at both 75° and 90° C. As can be seen from the data in Table 3, further enhancements to IR stability after immersion in both 75° C. and 90° C. water are demonstrated through the use of functionalized polybutadienes. Comparing the immersion temperatures 75° C. and 90° C., the polybutadiene styrene copolymer combined with the oligomeric vinyl silane based coating shows the best IR stability (Samples 5 verses 12 for each temperature). With the addition of the polybutadiene styrene copolymer, the IR stability is improved to a level to allow compliance with long term IR requirements of UL 44 at 90° C. and is more consistent across both immersion temperatures (Samples 1 and 7 for each temperature).

TABLE 3

| No. | Filler Type | Co-agent Type | |
|---|---|---|---|
| | | IR Rate of Change Regression at 75° C. between 19 and 24 Weeks Maximum Limit is −4% Rate of Change/Week | |
| | | | Rate of Change/Week, % |
| 1 | Vinyl silane | None | −8.81 |
| 2 | Vinyl silane | Alkoxysilane-terminated Polybutadiene | −6.58 |
| 3 | Vinyl silane | OH-terminated Polybutadiene | −7.89 |
| 4 | Vinyl silane | MA-terminated Polybutadiene | −18.49 |
| 5 | Vinyl silane | Polybutadiene Styrene Copolymer | 1.8 |
| 6 | Vinyl silane + Vinyl oligomeric silane | None | 6.4 |
| 7 | 12% vinyl-oligomeric silane | None | −5.64 |
| 8 | 12% vinyl-oligomeric silane | Alkoxysilane-terminated Polybutadiene | −3.42 |
| 9 | 12% vinyl-oligomeric silane | OH-terminated Polybutadiene | −4.72 |
| 10 | 12% vinyl-oligomeric silane | MA-terminated Polybutadiene | −15.33 |
| 11 | 12% vinyl-oligomeric silane | Polybutadiene Styrene Copolymer | −0.3 |
| | | IR Rate of Change Regression at 90° C. between 19 and 24 Weeks | |
| | | | Rate of Change, % |
| 1 | Vinyl silane | None | −5.79 |
| 2 | Vinyl silane | Alkoxysilane-terminated Polybutadiene | −5.08 |
| 3 | Vinyl silane | OH-terminated Polybutadiene | −1.52 |
| 4 | Vinyl silane | MA-terminated Polybutadiene | −21.47 |
| 5 | Vinyl silane | Polybutadiene Styrene Copolymer | −11.4 |
| 6 | Vinyl silane + Vinyl oligomeric silane | None | −5.8 |
| 7 | 12% vinyl-oligomeric silane | None | −1.32 |
| 8 | 12% vinyl-oligomeric silane | Alkoxysilane-terminated Polybutadiene | −7.95 |
| 9 | 12% vinyl-oligomeric silane | OH-terminated Polybutadiene | −2.05 |
| 10 | 12% vinyl-oligomeric silane | MA-terminated Polybutadiene | −6.92 |
| 11 | 12% vinyl-oligomeric silane | Polybutadiene Styrene Copolymer | −1.2 |

Notes:
Each measurement was carried out in triplicate.

Example 3

Fire Retardance of Cables Coated with Vinyl Oligomeric Silane Treated $Mg(OH)_2$ Compositions Comparative composition samples A-E were made according to the following formulations, with compositions B-D containing vinyl oligomeric silane treated $Mg(OH)_2$:

| | Formulas (relative to fire retardance) | | | | |
|---|---|---|---|---|---|
| | A | B | C | D | E |
| Ethylene-octene copolymer (0.87 density, 1 MI) | 92 | 90 | 90 | 90 | 100 |
| Ethylene vinyl acetate copolymer (9% VA) | 8 | | | 5 | |
| Ethylene butylacrylate copolymer (17% BA) | | 10 | 10 | 5 | |
| Phenolic Antioxidant | 1.25 | 1.25 | 1.25 | 1.25 | 1.25 |
| Dibasic lead pthalate dispersion | 7.5 | 7.5 | 7.5 | | 7.5 |
| Vinyl Silane treated clay | | | 20 | | 20 |
| Oligomeric silane treated Boehmite | 20 | 20 | | 20 | |
| Vinyl silane treated $Mg(OH)_2$ | 180 | | | | 180 |

-continued

| Formulas (relative to fire retardance) | | | | | |
|---|---|---|---|---|---|
| | A | B | C | D | E |
| Struktol WB 222 | 2 | 2 | 2 | 2 | 2 |
| Polyisoprene-vinyl pyridine copolymer | | 3 | | | |
| Polyisoprene-styrene-vinyl pyridine terpolymer | | | 3 | 3 | |
| Polybutadiene Styrene Copolymer | | | | | 3 |
| Zinc Stannate | 5 | 5 | 5 | 2.5 | |
| Vinyl Oligomeric silane treated Mg(OH)$_2$ | | 180 | 180 | 180 | |
| Zinc Borate | | | | 2.5 | |
| Peroxide | 1.6 | 1.6 | 1.6 | 1.6 | 1.6 |
| Total PHR | 317.4 | 320.4 | 320.4 | 312.9 | 315.4 |

The comparative compositions were prepared by a systematic weighment process of each raw material ingredient and charged into an internal Banbury mixer. Each composition was prepared separately through mastication and shear heating to a final batch temperature of approximately 300° F. then discharged and placed onto a 2-roll mill heated to 180° F. Strips of each compound were used to prepare a diced pellet for subsequent feeding into an extruder equipped with a steam vulcanization tube. Continuous curing was carried out at approximately 400° F. after a 0.045 inch thickness of coating was applied to a bare #14 AWG copper 7 wire conductor.

Cables coated with compositions A-E were tested for flame retardancy as shown in Table 4. An 18 inch specimen is vertically mounted in a draft free enclosure and a flame source is applied for 15 seconds and removed for 15 seconds for 5 cycles. The flame source is a 500 W burner source with a 40 mm flame generated from an air methane mixture controlled through the use of a flow meter and manometer. The burner flame is applied at an angle of 45° to the vertical plane and in the center of the specimen.

In order to achieve compliance, the specimen must self-extinguish within 60 seconds after each application of flame and must not emit droplets such that a layer of cotton below the specimen holder is ignited. The sample also must not propagate flame to to a height such that a Kraft paper flag is burned more than 25% of its surface.

TABLE 4

| BURN APPLICATION | SAMPLE 1 (SECS) | SAMPLE 2 (SECS) | SAMPLE 3 (SECS) | SAMPLE 4 (SECS) | SAMPLE 5 (SECS) | RESULT |
|---|---|---|---|---|---|---|
| SAMPLE: A | | | | | | |
| 1 | 0 | 0 | 1 | | | |
| 2 | 0 | 5 | 3 | | | |
| 3 | 3 | 2 | 5 | | | |
| 4 | 5 | 12 | 60 | | | |
| 5 | 12 | 60 | | | | |
| FLAG BURN YES/NO | NO | NO | NO | | | |
| COTTON BURN YES/NO | NO | NO | NO | | | |
| RESULT | PASS | FAIL | FAIL | | | FAIL |
| COMMENTS: | | | | | | |
| Flame propagates up wire continuously around third application | | | | | | |
| SAMPLE: B | | | | | | |
| 1 | 0 | 0 | 0 | 0 | 0 | |
| 2 | 0 | 3 | 0 | 0 | 0 | |
| 3 | 5 | 3 | 3 | 1 | 35 | |
| 4 | 8 | 0 | 34 | 0 | 0 | |
| 5 | 0 | 0 | 0 | 0 | 0 | |
| FLAG BURN YES/NO | NO | NO | NO | NO | NO | |
| COTTON BURN YES/NO | NO | NO | NO | NO | NO | |
| RESULT | PASS | PASS | PASS | PASS | PASS | PASS |
| COMMENTS: | | | | | | |
| Little or no sparking just as flame is applied during 2$^{nd}$ and 3$^{rd}$ application. | | | | | | |
| Flame seems to swirl around the sample. | | | | | | |
| SAMPLE: C | | | | | | |
| 1 | 0 | 0 | | | | |
| 2 | 1 | 3 | | | | |
| 3 | 19 | 23 | | | | |
| 4 | 15 | 10 | | | | |
| 5 | 0 | 0 | | | | |
| FLAG BURN YES/NO | NO | NO | | | | |

TABLE 4-continued

| | | | | |
|---|---|---|---|---|
| COTTON BURN YES/NO | NO | NO | | |
| RESULT | PASS | PASS | | PASS |
| COMMENTS: Flame dances on the surface in both up and down direction. | | | | |
| SAMPLE: D | | | | |
| 1 | 2 | 0 | | |
| 2 | 0 | 1 | | |
| 3 | 0 | 1 | | |
| 4 | 4 | 60 | | |
| 5 | 60 | | | |
| FLAG BURN YES/NO | YES | NO | | |
| COTTON BURN YES/NO | NO | NO | | |
| RESULT | FALL | FAIL | | FAIL |
| COMMENTS: Flame strokes the sample as it propagates up the wire. | | | | |
| SAMPLE: E | | | | |
| 1 | 10 | 1 | 1 | |
| 2 | 60 | 60 | 60 | |
| 3 | | | | |
| 4 | | | | |
| 5 | | | | |
| FLAG BURN YES/NO | NO | NO | YES | |
| COTTON BURN YES/NO | NO | NO | NO | |
| RESULT | FAIL | FALL | FAIL | FAIL |

COMMENTS:

As can be seen in Table 4, cables coated with Samples B and C passed the flame retardancy test. Sufficient char formation is achieved through a synergistic effect between the magnesium hydroxide, polyethylene butyl acrylate copolymer, and zinc stannate enough to suppress the flame and self extinguish itself (Sample C). Further enhancement is achieved through the synergistic combination of magnesium hydroxide, polyethylene butyl acrylate copolymer, zinc stannate, and aluminum monohydrate (Boehmite).

The invention has been disclosed broadly and illustrated in reference to representative embodiments described above. Those skilled in the art will recognize that various modifications can be made to the present invention without departing from the spirit and scope thereof.

What is claimed is:

1. A low smoke, fire-resistant and moisture resistant cable coating comprising:
    (a) an ethylene octene copolymer;
    (b) at least 5% by weight of an ethylene vinyl acetate copolymer or an ethylene butyl acrylate compolymer;
    (c) a fire retardant selected from the group consisting of antimony trioxide, antimony pentoxide, antimony tetraoxide, hexaantimony tridecaoxide, crystalline antimonic acid, lithium antimonate, barium antimonate, zinc borate, basic zinc molybdate, zinc calcium molybdate, zirconium oxide, zinc stannate, zinc oxide, iron oxide, red phosphorus, hydrated structured silicates, synthetic anionic hydrotalcite, and carbon black; and
    (d) at least 60 percent by weight of a blend of magnesium hydroxide and aluminum monohydrate.

2. The cable coating of claim 1 wherein the magnesium hydroxide and the aluminum monohydrate are treated with oligomeric silane.

3. The cable coating of claim 1, wherein the fire retardant is zinc stannate.

4. The cable coating of claim 1, wherein the ratio of magnesium hydroxide to aluminum monohydrate is 9 to 1.

5. A low smoke, fire-resistant and moisture resistant cable comprising a conductor and a coating, said coating comprising:
    (a) an ethylene octene copolymer;
    (b) at least 5% by weight of an ethylene vinyl acetate copolymer or an ethylene butyl acrylate compolymer;
    (c) a fire retardant selected from the group consisting of antimony trioxide, antimony pentoxide, antimony tetraoxide, hexaantimony tridecaoxide, crystalline antimonic acid, lithium antimonate, barium antimonate, zinc borate, basic zinc molybdate, zinc calcium molybdate, zirconium oxide, zinc stannate, zinc oxide, iron oxide, red phosphorus, hydrated structured silicates, synthetic anionic hydrotalcite, and carbon black; and
    (d) at least 60 percent by weight of a blend of magnesium hydroxide and aluminum monohydrate.

6. The cable of claim 5 wherein the magnesium hydroxide and the aluminum monohydrate are treated with oligomeric silane.

7. The cable of claim 5, wherein the fire retardant is zinc stannate.

8. The cable of claim 5, wherein the ratio of magnesium hydroxide to aluminum monohydrate is 9 to 1.

9. A method of making a low smoke, fire-resistant and moisture resistant cable comprising coating a conductor with a coating, said method comprising:
    (a) coating an electrical conductor with a coating, said coating comprising an ethylene octene copolymer; at least 5% by weight of an ethylene vinyl acetate copolymer or an ethylene butyl acrylate compolymer; a fire retardant selected from the group consisting of antimony trioxide, antimony pentoxide, antimony tetraoxide, hexaantimony tridecaoxide, crystalline antimonic acid, lithium antimonate, barium antimonate, basic zinc molybdate, zinc calcium molybdate, zirconium oxide, zinc stannate, zinc oxide, iron oxide, red phosphorus, hydrated structured silicates, synthetic anionic hydrotalcite, and carbon black; and at least 60 percent by weight of a blend of magnesium hydroxide and aluminum monohydrate; and (b) vulcanizing the coating.

10. The method of claim 9 wherein the magnesium hydroxide and the aluminum monohydrate are treated with oligomeric silane.

11. The method of claim 9, wherein the fire retardant is zinc stannate.

12. The method of claim 9, wherein the ratio of magnesium hydroxide to aluminum monohydrate is 9 to 1.

* * * * *